(12) United States Patent
Mutalikdesai et al.

(10) Patent No.: US 11,526,707 B2
(45) Date of Patent: Dec. 13, 2022

(54) UNSUPERVISED CONTEXTUAL LABEL PROPAGATION AND SCORING

(71) Applicant: International Business Machines Corporation, Armonk, NY (US)

(72) Inventors: Mandar Mutalikdesai, Bengaluru (IN); Sheetal Srivastava, Bengaluru (IN); Kartikeya Vats, Dehradun (IN); Debasish Kanhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/919,274

(22) Filed: Jul. 2, 2020

(65) Prior Publication Data
US 2022/0004826 A1 Jan. 6, 2022

(51) Int. Cl.
*G06F 16/901* (2019.01)
*G06K 9/62* (2022.01)

(52) U.S. Cl.
CPC ....... *G06K 9/6276* (2013.01); *G06F 16/9024* (2019.01); *G06K 9/6224* (2013.01);
(Continued)

(58) Field of Classification Search
CPC ...... G06N 20/00; G06N 3/0454; G06N 5/022; G06F 16/9024; G06F 16/3328;
(Continued)

(56) References Cited

U.S. PATENT DOCUMENTS

2011/0058698 A1* 3/2011 Buhmann .............. H04R 25/70
  381/314
2015/0052098 A1 2/2015 Kveton
  (Continued)

OTHER PUBLICATIONS

Wang et al., VOS: A new outlier detection model using virtual graph, Aug. 2, 2019 [retrieved Sep. 24, 2021], Knowledge-Based Systems, vol. 185, 12 pages. Retrieved: https://www.sciencedirect.com/science/article/pii/S0950705119303648 (Year: 2019).*

(Continued)

*Primary Examiner* — Matthew C Bella
*Assistant Examiner* — Dennis Rosario
(74) *Attorney, Agent, or Firm* — Randy E. Tejeda

(57) ABSTRACT

One or more computer processors creating a plurality of k-hop neighborhood contextual subgraphs utilizing extracted labelled nodes from an input graph; compute an eigenvector centrality score for each node contained in each created subgraph in the plurality of k-hop neighborhood contextual subgraphs; propagate a label for each node in each subgraph in the plurality of k-hop neighborhood contextual subgraphs leveraging an aggregated mathematical decay function, preserving a topical context of the label; calculate an attributable prestige vector for each node in each subgraph in the plurality of k-hop neighborhood contextual subgraphs based on the propagated label and the computed eigenvector centrality score associated with each node in each subgraph in the plurality of k-hop neighborhood contextual subgraph; and unsupervised predict a subsequent label for one or more subsequent nodes, subgraphs, or graphs utilizing the calculated attributable prestige vectors for each node in each subgraph.

20 Claims, 3 Drawing Sheets

(52) U.S. Cl.
CPC ......... *G06K 9/6226* (2013.01); *G06K 9/6259* (2013.01); *G06K 9/6297* (2013.01)

(58) Field of Classification Search
CPC ...... G06F 16/951; G06F 16/285; G06F 16/00; G06Q 50/01; G06Q 30/0244; G06Q 50/30; G06T 7/162; G06T 2207/20072; G06T 11/206; G06K 9/4638; G06K 9/6224; G06K 9/6296; G06K 9/6276; G06K 9/6259; H04L 67/306; H04L 67/10; H04L 67/535; H04W 4/21; G06V 10/44; G06V 10/42; G06V 10/82; G06V 10/426

See application file for complete search history.

(56) References Cited

U.S. PATENT DOCUMENTS

| | | | |
|---|---|---|---|
| 2018/0336457 A1 | 11/2018 | Pal | |
| 2019/0132224 A1* | 5/2019 | Verma | H04L 43/062 |
| 2020/0285944 A1* | 9/2020 | Lee | G06N 3/08 |
| 2020/0410028 A1* | 12/2020 | Shaabani | G06F 21/50 |

OTHER PUBLICATIONS

Tian et al., Global Linear Neighborhoods for Efficient Label Propagation, 2012 [retrieved Sep. 24, 2021], Proceedings of the 2012 SIAM International Conference on Data Mining, pp. 863-872. Retrieved: https://epubs.siam.org/doi/abs/10.1137/1.9781611972825.74 (Year: 2012).*

Koch et al., Graph-Based Label Propagation in Fetal Brain MR Images,Sep. 14, 2014, [retrieved Apr. 7, 2022], Machine Learning in Medical Imaging, Lecture Notes in Computer Science, vol. 8679, 8 pages. Retrieved: https://link.springer.com/chapter/10.1007/978-3-319-10581-9_2 (Year: 2014).*

Gould et al., Patchmatchgraph: Building a Graph of Dense Patch Correspondences for Label Transfer, Oct. 7-13, 2012 [retrieved Apr. 7, 2022], 12th European Conference on Computer Vision, 14 pages. Retrieved: https://link.springer.com/chapter/10.1007/978-3-642-33715-4_32 (Year: 2012).*

Raghaven et al., Near linear time algorithm to detect community structures in large-scale networks, Sep. 11, 2007 [retrieved Apr. 7, 2022], Physical Review E, vol. 76, Iss. 3, 11 pages. Retrieved: https://journals.aps.org/pre/abstract/10.1103/PhysRevE.76.036106 (Year: 2007).*

Zhu, Semi-Supervised Learning with Graphs, May 2005 [retrieved Apr. 7, 2022], Thesis: Carnegie Mellon University, 174 pages. Retrieved: https://pages.cs.wisc.edu/~jerryzhu/publications.html (Year: 2005).*

Zhu et al., Learning from Label and Unlabeled Data with Label Propagation, Jun. 2002 [retrieved Apr. 7, 2022], Carnegie Mellon University, 19 pages. Retrieved: https://pages.cs.wisc.edu/~jerryzhu/publications.html (Year: 2002).*

"A New Scoring Function for Bayesian Network Structure Learning Extended to Arbitrary Discrete Variables", © 2020 NYU, 3 pages, <https://cds.nyu.edu/projects/new-scoring-function-bayesian-network-structure-learning-extended-arbitrary-discrete-variables/>.

"Bayesian network", Wikipedia, last edited on May 26, 2020, 15 pages, <https://en.wikipedia.org/wiki/Bayesian_network>.

"Exponential Decay", Wolfram MathWorld, Last updated: Wed May 27, 2020, © 1999-2020 Wolfram Research, Inc, 1 page, <https://mathworld.wolfram.com/ExponentialDecay.html>.

"PageRank", Wikipedia, Last edited on May 22, 2020, 16 pages, <https://en.wikipedia.org/wiki/PageRank>.

"Politically exposed person", Wikipedia, Last edited on May 8, 2020, 7 pages, <https://en.wikipedia.org/wiki/Politically_exposed_person>.

Baeza-Yates et al., <Crawling the Infinite Web: Five Levels are Enough, International Workshop on Algorithms and Models for the Web-Graph, WAW 2004, 6 pages, <https://link.springer.com/chapter/10.1007/978-3-540-30216-2_13>.

Chakrabarti et al., "Joint Label Inference in Networks", Journal of Machine Learning Research 18 (2017), Submitted Apr. 2016; Revised Mar. 2017; Published Jul. 2017, 39 pages.

Du et al., "Dynamic label propagation in social networks". Database Systems for Advanced Applications, DASFAA 2013, 17 pages, <https://doi.org/10.1007/978-3-642-37450-0_14>.

Kato et al., "Robust Label Propagation on Multiple Networks", IEEE Transactions on Neural Networks, vol. 20, No. 1, Jan. 2009, 1045-9227, © 2008 IEEE, 10 pages.

Iscen et al., "Label Propagation for Deep Semi-Supervised Learning", arXiv:1904.04717v1 [cs.CV] Apr. 9, 2019, 10 pages.

Zhuang et al., "Local Label Propagation for Large-Scale Semi-Supervised Learning", arXiv:1905.11581v1 [cs.CV] May 28, 2019, 10 pages.

Yang et al., "Revisiting Semi-Supervised Learning with Graph Embeddings", Proceedings of the 33 rd International Conference on Machine Learning, New York, NY, USA, 2016, Copyright 2016 by the author(s), arXiv:1603.08861v2 [cs.LG] May 26, 2016, 9 pages.

Zhou et al., "Evidential Label Propagation Algorithm for Graphs", arXiv:1606.03832v1 [cs.AI] Jun. 13, 2016, 8 pages.

\* cited by examiner

UNSUPERVISED CONTEXTUAL LABEL PROPAGATION AND SCORING

BACKGROUND

The present invention relates generally to the field of graph networks, and more particularly to influence or information propagation in a network.

Bayesian networks, Bayes networks, belief networks, decision networks, Bayesian models, or probabilistic directed acyclic graphical models are probabilistic graphical models representing a set of variables and associated conditional dependencies. Bayesian networks are ideal for taking an event that occurred and predicting the likelihood that any one of several possible known causes was the contributing factor. For example, a Bayesian network could represent the probabilistic relationships between diseases and symptoms, where given symptoms, the network is utilized to compute disease probabilities.

Graph theory defines a network as a graph in which nodes and/or edges have attributes (e.g. names). Link analysis is a subset of network analysis, exploring associations between objects. Link analysis identifies relationships and associations between a plurality of objects of different types. Examples include climate networks where links between two nodes (i.e., locations) are determined by the similarity of the rainfall or temperature fluctuations in both sites. The structural robustness of networks is studied using percolation theory. Percolation occurs when a critical fraction of nodes (or links) is removed, fragmenting the network into small disconnected clusters which represent an order-disorder type of phase transition with critical exponents. Percolation can predict the size of the largest component, the critical percolation threshold, and critical exponents. For example, many of the leading web search ranking algorithms use link-based centrality metrics to understand and extract information from the structure of collections of web pages.

SUMMARY

Embodiments of the present invention disclose a computer-implemented method, a computer program product, and a system for propagating generated network scores while preserving topical label context. The computer-implemented method includes one or more computer processors creating a plurality of k-hop neighborhood contextual subgraphs utilizing extracted labelled nodes from an input graph. The one or more computer processors compute an eigenvector centrality score for each node contained in each created subgraph in the plurality of k-hop neighborhood contextual subgraphs, wherein each created k-hop neighborhood contextual subgraph reduces storage requirements. The one or more computer processors propagate a label for each node in each subgraph in the plurality of k-hop neighborhood contextual subgraphs leveraging an aggregated mathematical decay function, preserving a topical context of the label. The one or more computer processors calculate an attributable prestige vector for each node in each subgraph in the plurality of k-hop neighborhood contextual subgraphs based on the propagated label and the computed eigenvector centrality score associated with each node in each subgraph in the plurality of k-hop neighborhood contextual subgraphs, wherein the prestige vector dimensions are equal to a number of distinct labels in the input graph. The one or more computer processors unsupervised predict a subsequent label for one or more subsequent nodes, subgraphs, or graphs utilizing the calculated attributable prestige vectors for each node in each subgraph.

DETAILED DESCRIPTION

Figure 1:
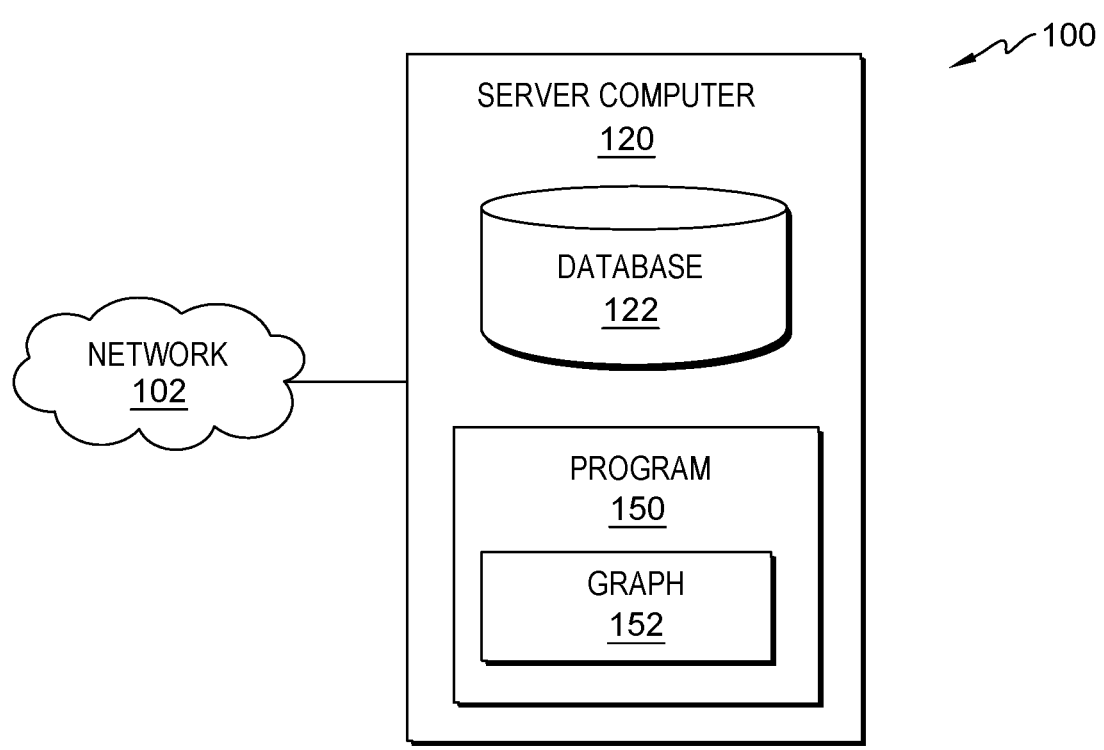
FIG. 1 is a functional block diagram illustrating a computational environment, in accordance with an embodiment of the present invention.

Network scoring in graphs has traditionally been addressed using the Bayesian models which consider nodes to be random variables. Bayesian models calculate a conditional probability of specified a node assuming that said node is a starting node. However, said modeling using conditional probabilities does not consider nor retain a context of a label or a node. Current web link analysis techniques and algorithms can also be used to propagate label scores through a network; however, it is not possible to propagate multiple non-uniform labels through the network using traditional techniques. Current web link analysis techniques utilize random walk which converge to the same principal eigenvector regardless of the label from which the random walk began (e.g., source node). Said techniques fail to consider the topicality of the label propagation and does not preserve the context of the label. Traditionally, label prediction, or classification of nodes, has conventionally been approached as either a supervised or a semi-supervised technique using embeddings and/or feature vectors of nodes. Supervised and semi-supervised require substantial human intervention and, often, the use of subject matter experts.

Embodiments of the present invention generate a network score for a given label in a graph and propagate the generated score to other nodes of the graph while, simultaneously, preserving label topical context. Embodiments of the present invention introduce a degree of exposure and/or magnitude utilizing a decay function dependent on a distance of each node from the label. Embodiments of the present invention propagate a label to other nodes such that the connectivity of neighboring nodes considered along with relative distance (hops) from a source node. Embodiments of the present invention do not propagate a given label to unconnected nodes. Embodiments of the present invention utilize the propagated labels, nodes, and associated scores to calculate an exposure value for a subject of interest (SOI) or source node. Embodiments of the present invention combine graph centrality algorithm and a mathematical decay function to effectively score and label propagation while preserving topical and local context. Embodiments of the present invention determine the propagation of contextual influence or information and utilize the propagation to predict the reach of that influence or information on a given node. Embodiments of the present invention utilize propagated and scored graphs for unsupervised prediction of labels or the classification of nodes. Embodiments of the present invention utilize computed network scores generated for each node, with respect to a label, to compute the probability of a node associated with a specific label. Embodiments of the present invention reduce computational requirements of a network due to the generation and utilization of subgraphs, substantially reducing storage requirements. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 3.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical graphs, influence samples (e.g., biases, opinions, views, etc.), associated node information (e.g., news, articles, references, etc.), labels, and associated scores.

Graph 152 is representative of any structure amounting to a set of objects in which some pairs of the objects are related. In an embodiment, said objects correspond to mathematical abstractions called nodes. In a further embodiment, each of the related pairs of nodes is called an edge. In various embodiments, graph 152 is representative of a weighted graph containing edges with numerical weights. In an alternative embodiment, graph 152 is representative of an unweighted graph. In another embodiment, graph 152 is a graph neural network trained to calculate weights, ingest inputs, and output a plurality of solution vectors. In an embodiment, graph 152 is a Bayesian network, Bayes network, belief network, decision network or probabilistic directed acyclic graphical model. Graph 152 is depicted and described in further detail with respect to FIG. 2.

Program 150 is a program for propagating generated network scores while preserving topical label context. In various embodiments, program 150 may implement the following steps: creating a plurality of k-hop neighborhood contextual subgraphs utilizing extracted labelled nodes from an input graph; computing an eigenvector centrality score for each node contained in each created subgraph in the plurality of k-hop neighborhood contextual subgraphs, wherein each created k-hop neighborhood contextual subgraph reduces storage requirements; propagating a label for each node in each subgraph in the plurality of k-hop neighborhood contextual subgraphs leveraging an aggregated mathematical decay function, preserving a topical context of the label; calculating an attributable prestige vector for each node in each subgraph in the plurality of k-hop neighborhood contextual subgraphs based on the propagated label and the computed eigenvector centrality score associated with each node in each subgraph in the plurality of k-hop neighborhood contextual subgraphs, wherein the prestige vector dimensions are equal to a number of distinct labels in the input graph; and unsupervised predicting a subsequent label for one or more subsequent nodes, subgraphs, or graphs utilizing the calculated attributable prestige vectors for each node in each subgraph. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
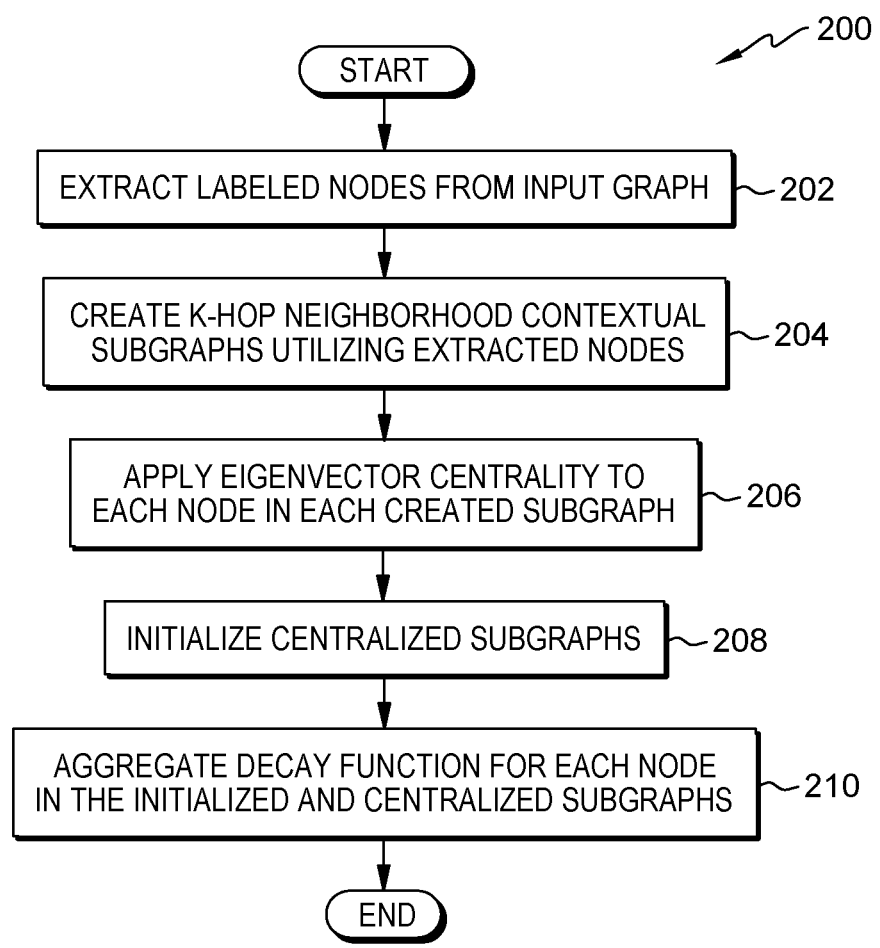
FIG. 2 is a flowchart depicting operational steps of a program, on a server computer within the computational environment of FIG. 1, for propagating generated network scores while preserving topical label context, in accordance with an embodiment of the present invention.

FIG. 2 is a flowchart depicting operational steps of program 150 for propagating generated network scores while preserving topical label context, in accordance with an embodiment of the present invention.

Program 150 extracts labeled nodes from an input graph (step 202). In an embodiment, program 150 initiates when detecting or receiving with one or more graphs (e.g., graph 152) or by user request. In an embodiment, program 150 extracts N labels (e.g., "A", "B", "C" . . . ) from an input graph, where N labels comprise all distinct labels and/or classes contained with the input graph. In various embodiments, program 150 contextualizes particular labels when network scoring, as described in the steps below, for the N labels. In an embodiment, program 150 creates one or more contextual (e.g., parent) subgraphs for each of the N labels and separates the nodes into associated subgraphs, ensuring that only relevant nodes are retained and, subsequently, scored for a given label. For example, program 150 receives a graph containing a graph of politically exposed entities (PEP) as nodes and a plurality of associated labels. In this example, program 150 extracts all nodes labeled as PEP located the graph. In this example, this information is stored as a node label, for example: 'label'='PEP'. In an embodiment, label information is available from a structured source, such as database 122. In the step below, program 150 induces the k-hop neighborhood of said nodes in order to avoid utilizing an entire graph at once and reducing the dilution the impact of the label (e.g., 'PEP').

Program 150 creates k-hop neighborhood contextual subgraphs utilizing extracted labels (step 204). Program 150, responsively, creates a plurality of k-hop neighborhood contextual subgraphs utilizing the extracted nodes from step 202. In an embodiment, each subgraph only contains labeled nodes, such as PEP. In an embodiment, program 150 generates a non-uniform score for all such nodes in each subgraph due to each node having a varying degree of influence (e.g., prestige, exposure, etc.). In another embodiment, program 150, initially, assigns all nodes in the neighborhood of a label to be uniformly exposed. In the above embodiments, program 150 creates a plurality of subgraphs, each retaining the context of the label and preventing the dilution of the label.

Program 150 applies eigenvector centrality to each created subgraph (step 206). Program 150 applies eigenvector centrality or any other methods of measuring and/or calculating prestige (i.e., a measure of the influence of a node) such as betweenness and closeness. In an embodiment, larger eigenvector or prestige scores signify that said node is connected to other nodes (e.g., neighborhood nodes) that have, respective, high scores. Program 150 computes an influence or prestige score for each induced subgraph corresponding to the context of specified label. In an embodiment, for each subgraph program 150 computes an influence score for all the contained nodes. Here, program 150 calculates an attributable prestige vector for each node in each subgraph. In a further embodiment, the dimensions of the prestige vector are equal to the number of distinct and unique labels in the, initial, input graph. In an embodiment, for a specified label, all nodes that are not present in the contextual subgraph (i.e., distinct from the specified label) are assigned a prestige score of zero, ensuring that the prestige vector for each node is of the same dimension. In an embodiment, program 150 utilizes eigenvector centrality techniques to ensure the internode relations of the nodes are retained and considered. In an embodiment, program 150 assigns influential nodes with a higher weight. In an embodiment, program 150 utilizes a random walker to select an edge with a probability that is proportional to the weight of the edge. In an embodiment, program 150 computes one or more centrality scores for a specified contextual network instead of the whole graph and, responsively, program 150 stores the computed score for each node. Further, for nodes that are not present in a selected subgraph, program 150 assigns respective score as zero in a centrality vector. In an embodiment, program 150 only scores the relevant nodes in a subgraph induced over a specified label.

Program 150 initializes centralized subgraphs (step 208). Program 150, responsively to the completion of the application of eigenvector centrality, program 150 initiates label prorogation. In an embodiment, program 150 initializes all scores for all nodes based on one or more associated labels. For example, if a specified node is labeled (i.e. label=true) then the initial score (c) for that node is set to 1, else the score is set to 0.

Program 150 aggregates decay for each node in the initialized and centralized subgraphs (step 210). Program 150 prorogates each label utilizing any mathematical decay function known in the art. In various embodiments, program 150 assigns one or more scores to each of the nodes in a network based on associated labels while considering the distance of each node in the network from labeled nodes. This embodiment ensures that the influence and/or prestige of the label is carried forward in the network. In an embodiment, program 150 utilize or leverages an exponential decay function. In this embodiment, program 150 utilizes the exponential decay function to calculate a score of a node that in a k-hop neighborhood from a source node or a highly influential labeled node and dampens the score accordingly. In an embodiment, program 150 only propagates a portion of a label score to nodes that are farther away (e.g., 5 hops). In other embodiments, program 150 utilizes any decay or dampening function based on the requirements of the graph (e.g., logarithmic decay functions allow for negative values).

In an embodiment, program 150 computes the exponential decay function of the distance (measured as number of hops/edges between 2 nodes) between an ith node and jth node. Program 150 aggregates said for an ith node with respect to all the labeled nodes in the network. Subsequently, program 150 utilizes the aggregation as a multiple to the centrality score calculated in step 206 (e.g., eigenvector centrality score/vector) for a node and stored as a final influence or prestige score, vector, or value for the node. In an embodiment, this store final influence scores account for an extent of exposure of each node in the context of the label, such as a PEP.

In an embodiment, program 150 utilizes equation 1, as follows, for all i belonging to N, and all j belonging to the set of all labeled nodes in a subgraph L $$s_i = c_i + \left( p_i * \sum_{j=1}^{i} e^{\frac{1}{2^h}} \right) \quad (1)$$

where $s_i$ the final computed score for the ith node, $c_i$ is the initial score for the ith node, $p_i$ is the calculated eigenvector centrality score for the ith node, and h is the sum of the edge weights on the shortest path from the jth node to the ith node. In an embodiment, the range interval for the calculated eigenvector centrality score, $p_i$, is [0,1]. In another embodiment, the range interval for the values of the exponential decay function [1, e]. In an embodiment, program 150 sets all edges to be of a uniform capacity where all edge weights are set to 1 for all weighted graphs. In another embodiment, h is to the number of hops from the jth node to the ith node, for all unweighted graphs.

Responsively to a scored graph, program 150 normalizes one or more stored values or vectors. In an embodiment, program 150 utilizes the normalized scored graph for unsupervised label prediction in any related graph. This embodiment does not require any training due to the network edges and existing labels contained in the graph, therefore, the labels for any existing or new nodes in the graph can be computed on the fly. In an embodiment, program 150 utilizes a final scored graph to identify one or more subjects of interest (SOI). Here, program 150 propagates a label on a SOI with a final score above a specified score threshold which results the amount or level of exposure of the SOI.

Figure 3:
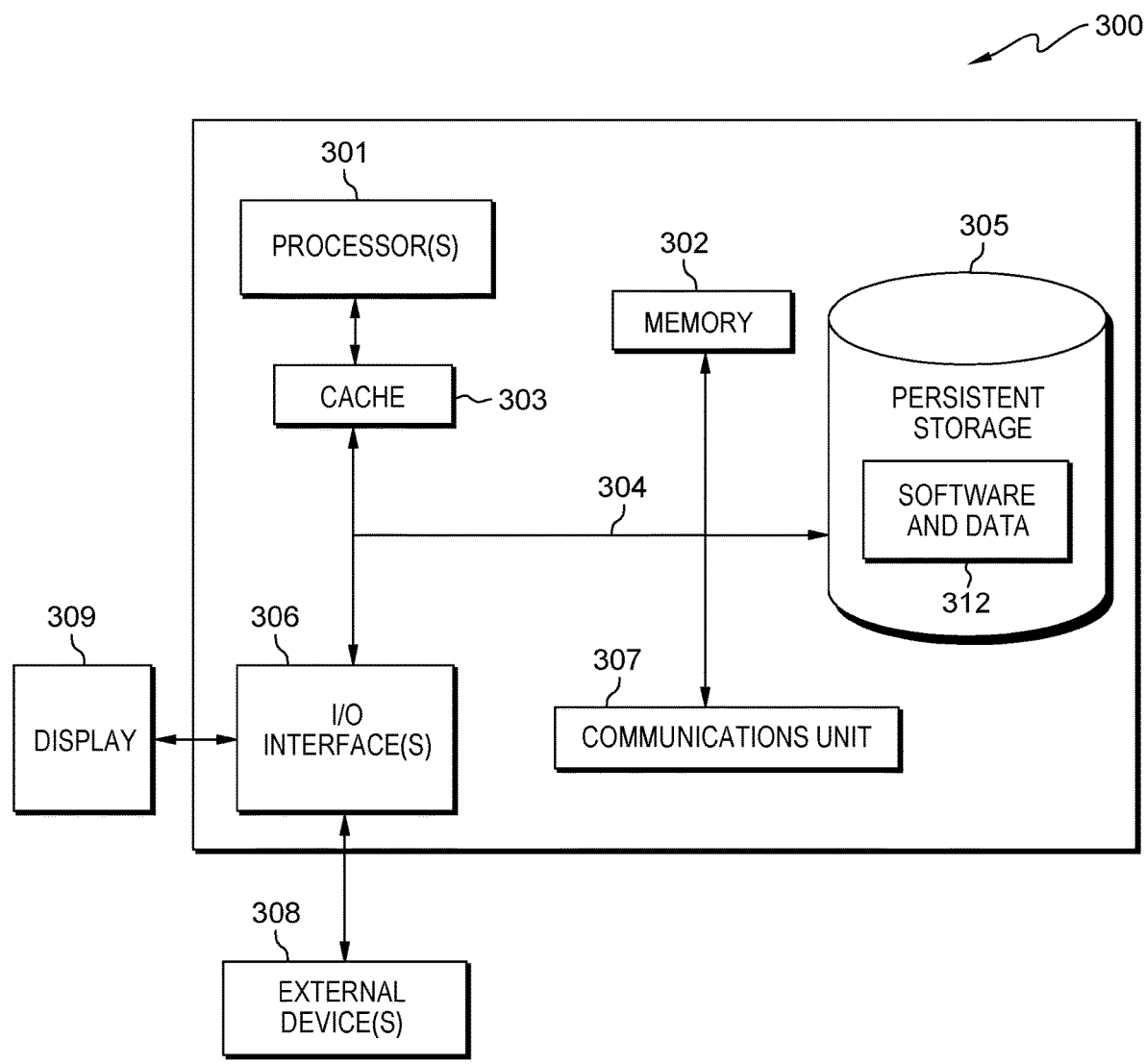
FIG. 3 is a block diagram of components of the server computer, in accordance with an embodiment of the present invention.

FIG. 3 depicts a block diagram of components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 312 can be stored in persistent storage 305 for access and/or execution by one or more of the respective processors 301 via cache 303.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
  creating, by one or more computer processors, a plurality of neighborhood contextual subgraphs utilizing extracted labelled nodes from an input graph;
  computing, by one or more computer processors, an eigenvector centrality score for each node contained in each created subgraph in the plurality of neighborhood contextual subgraphs, wherein each created neighborhood contextual subgraph reduces storage requirements;

propagating, by one or more computer processors, a label for each node in each subgraph in the plurality of neighborhood contextual subgraphs leveraging an aggregated mathematical decay function, preserving a topical context of the label, wherein the aggregated mathematical decay function is exponentially related to a number of hops from a labelled node to another node;

calculating, by one or more computer processors, an attributable prestige vector for each node in each subgraph in the plurality of neighborhood contextual subgraphs based on the propagated label and the computed eigenvector centrality score associated with each node in each subgraph in the plurality of neighborhood contextual subgraphs, wherein a plurality of prestige vector dimensions is equal to a number of distinct labels in the input graph; and unsupervised predicting, by one or more computer processors, a subsequent label for one or more subsequent nodes, subgraphs, or graphs utilizing the calculated attributable prestige vectors for each node in each subgraph.

2. The method of claim 1, further comprising:
identifying, by one or more computer processors, a subject of interest based on the calculated attributable prestige vector for each node in each subgraph in the plurality of neighborhood contextual subgraphs.

3. The method of claim 1, wherein the prestige vector represents an extent of exposure of each node in the topical context of the label.

4. The method of claim 1, wherein the aggregated mathematical decay function is $$s_i = c_i + \left(p_i * \sum_{j=1}^{i} e^{2\frac{1}{h}}\right),$$

wherein $s_i$ a final computed score for the ith node, $c_i$ is an initial score for the ith node, $p_i$ is a calculated eigenvector centrality score for the ith node, and h a number of hops from the jth node to the ith node, for all unweighted graphs.

5. The method of claim 1, wherein propagating the label for each node in each subgraph in the plurality of neighborhood contextual subgraphs leveraging the aggregated mathematical decay function, preserving the topical context of the label, further comprises:
utilizing, by one or more computer processors, a random walker to select an edge with a probability that is proportional to a weight of an edge.

6. The method of claim 1, further comprising:
normalizing, by one or more computer processors, the calculated attributable prestige vector associated with each node in each subgraph in the plurality of neighborhood contextual subgraphs.

7. The method of claim 1, wherein the mathematical decay function is a logarithmic decay function.

8. A computer program product comprising:
one or more computer readable storage media and program instructions stored on the one or more computer readable storage media, the stored program instructions comprising:
program instructions to create a plurality of neighborhood contextual subgraphs utilizing extracted labelled nodes from an input graph;
program instructions to compute an eigenvector centrality score for each node contained in each created subgraph in the plurality of neighborhood contextual subgraphs, wherein each created neighborhood contextual subgraph reduces storage requirements;
program instructions to propagate a label for each node in each subgraph in the plurality of neighborhood contextual subgraphs leveraging aggregated mathematical decay function, preserving a topical context of the label, wherein the aggregated mathematical decay function is exponentially related to a number of hops from a labelled node to another node;
program instructions to calculate an attributable prestige vector for each node in each subgraph in the plurality of neighborhood contextual subgraphs based on the propagated label and the computed eigenvector centrality score associated with each node in each subgraph in the plurality of neighborhood contextual subgraphs, wherein a plurality of prestige vector dimensions is equal to a number of distinct labels in the input graph; and
program instructions to unsupervised predict a subsequent label for one or more subsequent nodes, subgraphs, or graphs utilizing the calculated attributable prestige vectors for each node in each subgraph.

9. The computer program product of claim 8, wherein the program instructions, stored on the one or more computer readable storage media, further comprise:
program instructions to identify a subject of interest based on the calculated attributable prestige vector for each node in each subgraph in the plurality neighborhood contextual subgraphs.

10. The computer program product of claim 8, wherein the prestige vector represents an extent of exposure of each node in the topical context of the label.

11. The computer program product of claim 8, wherein the aggregated mathematical decay function is $$s_i = c_i + \left(p_i * \sum_{j=1}^{i} e^{2\frac{1}{h}}\right),$$

wherein $s_i$ a final computed score for the ith node, $c_i$ is an initial score for the ith node, $p_i$ is a calculated eigenvector centrality score for the ith node, and h a number of hops from the jth node to the ith node, for all unweighted graphs.

12. The computer program product of claim 8, wherein the program instructions to propagate the label for each node in each subgraph in the plurality of neighborhood contextual subgraphs leveraging the aggregated mathematical decay function, preserving the topical context of the label, further comprise:
program instructions to utilize a random walker to select an edge with a probability that is proportional to a weight of an edge.

13. The computer program product of claim 8, wherein the program instructions, stored on the one or more computer readable storage media, further comprise:
program instructions to normalize the calculated attributable prestige vector associated with each node in each subgraph in the plurality of neighborhood contextual subgraphs.

14. The computer program product of claim 8, wherein the mathematical decay function is a logarithmic decay function.

15. A computer system comprising:
one or more computer processors;
one or more computer readable storage media; and program instructions stored on the computer readable storage media for execution by at least one of the one or more processors, the stored program instructions comprising:

program instructions to create a plurality of neighborhood contextual subgraphs utilizing extracted labelled nodes from an input graph;

program instructions to compute an eigenvector centrality score for each node contained in each created subgraph in the plurality of neighborhood contextual subgraphs, wherein each created neighborhood contextual subgraph reduces storage requirements;

program instructions to propagate a label for each node in each subgraph in the plurality of neighborhood contextual subgraphs leveraging aggregated mathematical decay function, preserving a topical context of the label, wherein the aggregated mathematical decay function is exponentially related to a number of hops from a labelled node to another node;

program instructions to calculate an attributable prestige vector for each node in each subgraph in the plurality of neighborhood contextual subgraphs based on the propagated label and the computed eigenvector centrality score associated with each node in each subgraph in the plurality of neighborhood contextual subgraphs, wherein a plurality of prestige vector dimensions is equal to a number of distinct labels in the input graph; and program instructions to unsupervised predict a subsequent label for one or more subsequent nodes, subgraphs, or graphs utilizing the calculated attributable prestige vectors for each node in each subgraph.

16. The computer system of claim 15, wherein the program instructions, stored on the one or more computer readable storage media, further comprise:

program instructions to identify a subject of interest based on the calculated attributable prestige vector for each node in each subgraph in the plurality of neighborhood contextual subgraphs.

17. The computer system of claim 15, wherein the prestige vector represents an extent of exposure of each node in the topical context of the label.

18. The computer system of claim 15, wherein the aggregated mathematical decay function $$s_i = c_i + \left( p_i * \sum_{j=1}^{i} e^{2\frac{1}{h}} \right),$$

wherein $s_i$ a final computed score for the ith node, $c_i$ is an initial score for the ith node, $p_i$ is a calculated eigenvector centrality score for the ith node, and h a number of hops from the jth node to the ith node, for all unweighted graphs.

19. The computer system of claim 15, wherein the program instructions to propagate the label for each node in each subgraph in the plurality of neighborhood contextual subgraphs leveraging the aggregated mathematical decay function, preserving the topical context of the label, further comprise:

program instructions to utilize a random walker to select an edge with a probability that is proportional to a weight of an edge.

20. The computer system of claim 15, wherein the program instructions, stored on the one or more computer readable storage media, further comprise:

program instructions to normalize the calculated attributable prestige vector associated with each node in each subgraph in the plurality of neighborhood contextual subgraphs.

* * * * *